March 21, 1967 C. E. HESP ET AL 3,310,239
RUNNER SUPPORTED SPRAY BOOM HAVING MOBILE SUPPLY MEANS
Filed Jan. 27, 1965 2 Sheets-Sheet 1
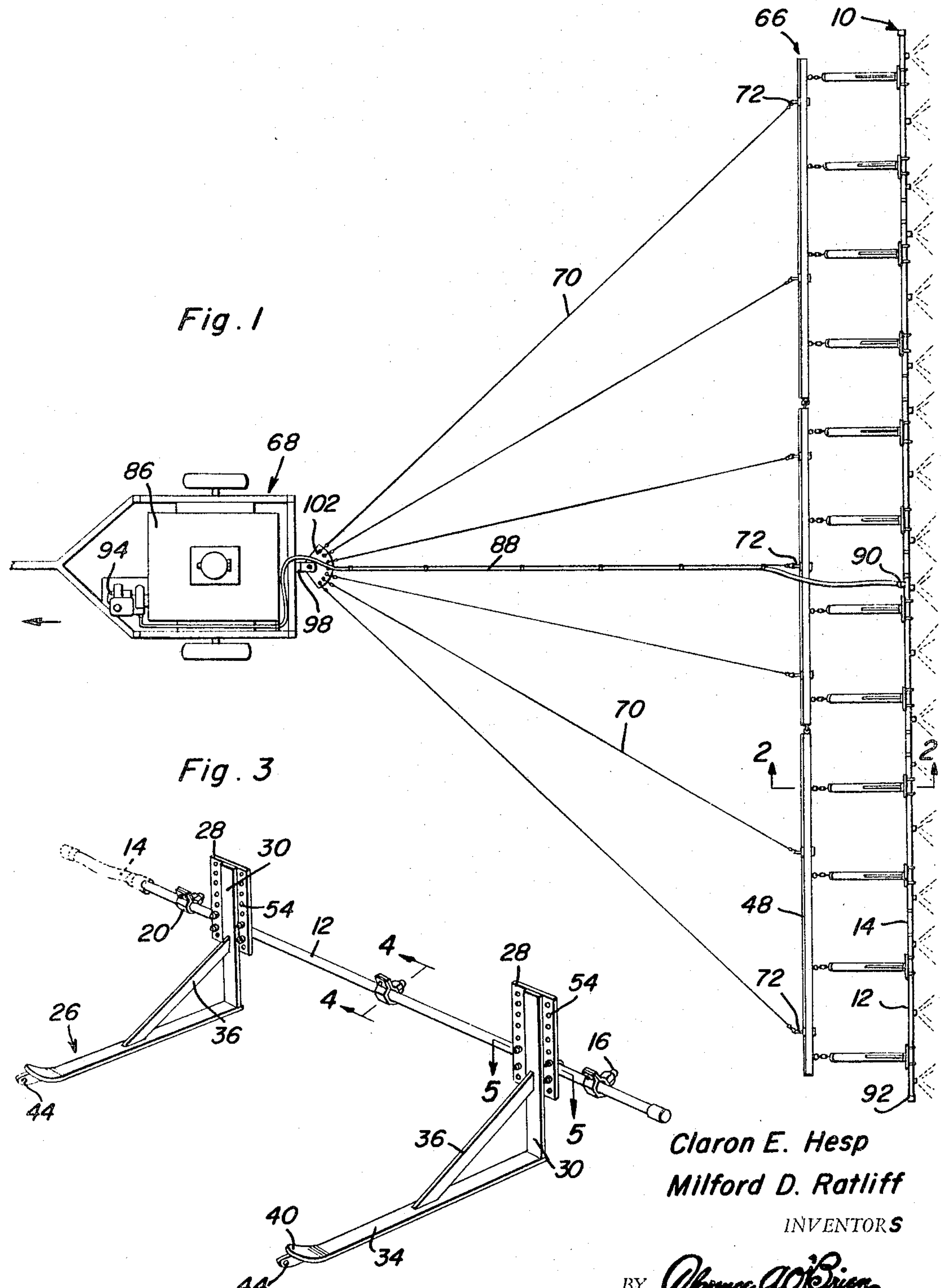
Claron E. Hesp
Milford D. Ratliff
INVENTORS
BY Clarence A. O'Brien and Harvey B. Jacobson
Attorneys RUNNER SUPPORTED SPRAY BOOM HAVING MOBILE SUPPLY MEANS
Filed Jan. 27, 1965 2 Sheets-Sheet 2
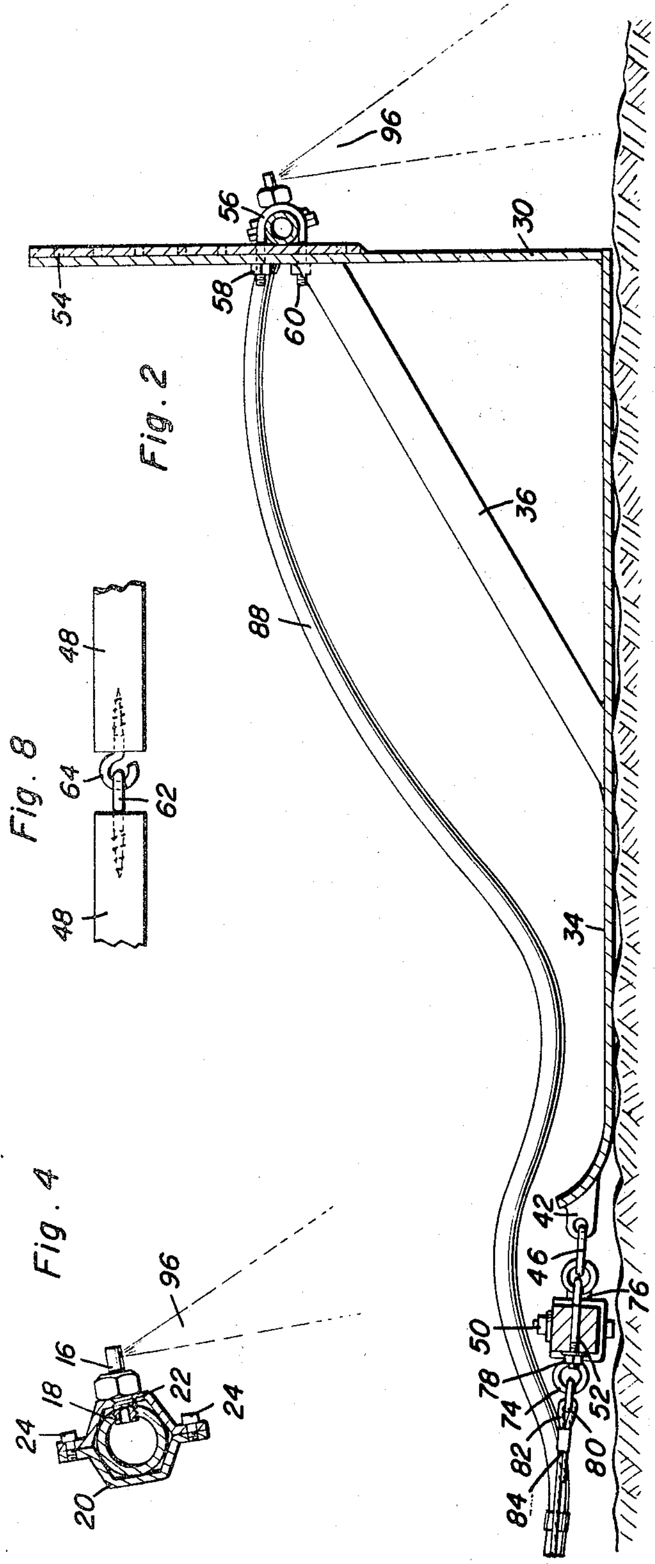
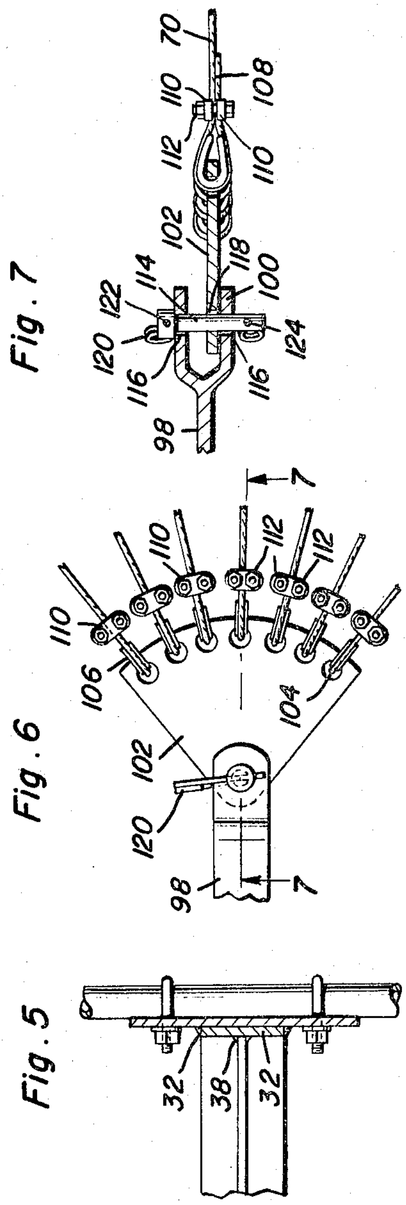
Claron E. Hesp
Milford D. Ratliff
INVENTORS
BY Clarence A. O'Brien and Harvey B. Jacobson
Attorneys United States Patent Office 3,310,239
Patented Mar. 21, 1967

1

3,310,239

RUNNER SUPPORTED SPRAY BOOM HAVING MOBILE SUPPLY MEANS

Claron E. Hesp, Athena, and Milford D. Ratliff, Weston, Oreg., assignors to Farm Chemicals of Oregon, Inc., a corporation of Oregon Filed Jan. 27, 1965, Ser. No. 428,309
3 Claims. (Cl. 239—169)

This invention relates to new and useful improvements and structural refinements in crop sprayers, for applying liquid fertilizers, herbicides, or pesticides to soils or growing crops. In particular, the invention relates to crop sprayers of the type employing an elongated boom, which conveys the liquid to be applied through spray nozzles located along the boom.

The principal object of the present invention is to provide an improved supporting structure for the elongated boom, this structure being independent of the drafting implement or land vehicle which pulls the elongated boom over the area to be sprayed.

Elongated booms, and in particular aluminum booms, for conveying a pumped liquid, or spray, to distributing orifices, or spray nozzles, are well known in the art. This invention, however, relates to a new and novel supporting means for supporting the elongated aluminum boom above the ground, or area, to be sprayed. The boom as disclosed in this invention is mounted upon skids or runners which slide across the ground behind a powered vehicle. Skids or runners which slide across the ground behind a powered vehicle, are also well known in the art. Heretofore, in a spraying apparatus using a boom-type arrangement to which the spray nozzles are mounted, the spray boom has always been suspended from an A-frame, or supported and carried by an axle and steel or rubber-tired wheels. This invention provides a new means of supporting the spray boom which combines a spray boom with runners or skids in lieu of the conventional well-known A-frame or wheel base supporting arrangement.

A further object of this invention is to support the boom in a boom-type spraying apparatus by runner brackets, which are spaced along the spray boom. A plate affixed to the bracket has vertical apertures along the sides thereof so arranged as to permit raising or lowering of the boom height above the ground or crop to be sprayed.

The boom-type spraying apparatus being supported by the skid runners will glide along the ground, and the boom will slip across irregularities or ditches without difficulty. These same skid or ski runners will prevent side slippage on steep slopes and the combination of drawbar and ski runner will leave good guide marks to indicate the area which has previously been sprayed. The boom itself is made of aluminum, while the bottom of the ski runners are chrome-plated to ease them across the ground surface. Because of the light draft and simple free frame construction a 100-foot boom consisting of ten sections is practical and easy to used.

A still further object of this invention is to provide a boom-type spraying apparatus which is completely separated from vehicle supports and is towed as a complete separate unit with cables. In prior known boom-type spraying apparatus, the boom itself is suspended in some fashion from the vehicle.

The boom-type spraying apparatus disclosed in this invention is adapted to keep the sprayed material close to the crop or soil where the spray is to be applied and permits the operation of the sprayer in windy conditions.

In a preferred embodiment of this invention a boom-type spraying apparatus is constructed in ten-foot sections, that is, the boom is ten feet in length, and is attached to two ski runners which will keep the section rigid. Two ten-foot sections are connected to a twenty-foot drawbar whereby various lengths of boom may be connected in increments of 20 feet. The spray boom sections are connected to each other by a flexible hose arrangement with a female quick coupler, enabling the operator to disassemble the boom for transporting the spraying apparatus from one field to another using public roads if necessary, or for storing the sections where it is desirable to disassemble the boom.

2

A still further object of this invention is to provide a boom-type spraying apparatus unit which is a complete unit in itself and does not have to be attached to any vehicle except when to be towed by a cable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the elongated boom-type spraying apparatus of this invention, and showing several sections of boom sprayers connected together to form a boom spraying apparatus of substantial length, and showing the drawbar arrangement connected to the boom spraying apparatus and connected to a trailer carrying a sprayer tank with a flexible hose extending from the sprayer tank to the elongated boom to provide spray material to the nozzles which are located on the elongated boom;

FIGURE 2 is an enlarged cross-sectional view taken substantially along section line 2—2 of FIGURE 1, and showing the boom supported on a runner bracket which is connected to a drawbar and cable for drawing the boom sprayer along the ground;

FIGURE 3 is a perspective view of a section of a boom-type spraying apparatus of this invention, showing the boom-type spraying apparatus as an independent unit supported only by the runner brackets, and showing in dotted lines a quick coupling flexible hose arrangement for connecting the section to an adjacent section;

FIGURE 4 is a cross-sectional view of the boom, and spray nozzle, taken substantially along section line 4—4 of FIGURE 3, and showing the means for attaching the spray nozzle to the elongated boom;

FIGURE 5 is a plan view of the boom and runner bracket for supporting the boom taken substantially along section line 5—5 of FIGURE 3 and showing the supporting bracket and supporting plate for the elongated boom in cross-section;

FIGURE 6 is a plan view of a drafting plate which is connected at one end to the drawbar of the drafting means, and at the other end thereof is connected to several cables which are adapted to draft the elongate spray boom arrangement such as is shown in FIGURE 1 along the ground;

FIGURE 7 is a cross-sectional view of the drafting plate of FIGURE 6 and showing the drafting plate connected to the drawbar, also in cross-section, the section being taken substantially along line 7—7 of FIGURE 6; and FIGURE 8 is a front elevational view of a preferred means for connecting together two drafting bars, which in a preferred arrangement of this invention are each designed to pull two ten-foot section spray booms.

The principal use of the runner bracket boom arrangement disclosed in this invention is for application of pesticides on crop lands before the crops are planted, before they emerge or while the crops are relatively small. The runner bracket boom arrangement is especially adapted for the control of broadleafed weeds in cereal crops, whereby the drawbar will drag over the tops of the young cereal plants but will not seriously injure or damage them. The drawbar is preferably 20 feet in length and two ten-foot sections of the boom with runners are attached to one length of the drawbar. The draft of the runner bracket boom arrangement itself will tend to hold the drawbar partially in suspension.

Referring now to the drawings in particular, an elongate boom 10, is composed of six boom sections 12, which are preferably ten-foot sections. The boom sections 12 are connected together by flexible hose quick couplings 14, and each boom section is shown as having three spray nozzles 16 thereon. The spray nozzles 16 are threaded into the boom section by the threaded nipple 18 provided on the spray nozzle. The spray nozzles are rigidly secured in place by two opposing nozzle brackets 20 one of which has a threaded base 22 therein for receiving the threaded nipple 18 of the spray nozzle 16. The spray nozzle brackets 20 are rigidly connected together by bolts 24. The ten-foot section boom 12 is connected to a runner bracket 26 by supporting plates 28 which are welded to upstanding bearing arms 30 by welds 32. The upstanding bearing arms 30 of the runner bracket are connected to the runners or skis 34 by supporting bars 36, which are welded to the upstanding bearing arms 30 by welds 38 and are welded to the runners or skis 34 by similar welds. The runners or skis 34 have upturned forward ends 40 which are designed to slip over the surface of the ground and any vegetation which may be growing in the ground, to facilitate the movement of the ski brackets and boom sections along the ground. The upturned ends 40 of the skis or runners 34 have drafting plates 42 connected thereto, which drafting plates have eyes 44 therein adapted to receive a chain 46 therein. A drafting bar 48 is connected to the drafting plates 42 of the runners or skis 34 by the chain which is secured around a nut and bolt arrangement 50, which extends through the drafting bar. An aperture 52 is provided in the drafting bar 48 for receiving the chain, that is, one link of the chain 46, so that the bolt of the nut and bolt arrangement 50 may be inserted through the chain link. Two ten-foot lengths of the boom sections 12 are so connected to a drafting bar 48 to give a 20-foot boom-type spraying apparatus. A series of holes 54 are provided in the bearing plate 28 to permit adjustment of the height of the boom section 12 above the ground surface. The boom section 12 is secured to the plate 28, and thereby to the runner bracket 26 by U-bolts 56 which are adapted to extend around the boom section 12 and through two holes 54 in the plate 28. The U-bolts 56 are tightly secured in place by threaded nuts 58 which thread down onto the threaded ends 60 of the U-bolts 56, until the nuts 58 tightly abut against the plate 28.

An elongated boom-type spraying apparatus of more than 20 feet may be formed by coupling a plurality of 20-foot sections together which are defined by the 20-foot length drawbar 48 preferred in this invention. In FIGURE 8 a preferred means for attaching two drawbars 48 together is illustrated wherein an eye screw 62 is shown with the hook screw 64 attached thereto. In FIGURE 1, three such drafting bars 48 are shown connected together to form an elongated drafting bar 66, which in this illustration would be 60 feet in length.

The elongated spray boom 10 is connected to drafting means 68, which in this instance is a trailer, by cables 70 which are connected to the elongated drafting bar 66 by ring and eye joints 72, which comprise a ring 74 connected to a bolt 76 which projects through the drafting bar 48, and is fastened thereto by a nut 78. The ring 74 has a ring 80 extending through its eye, and the ring 80 extends also through a loop 82 in the cable 70, which loop is formed by bending the cable 70 back on itself. The end of the cable bent back on itself is rigidly secured to the cable 70 by a clasp 84. The trailer 68 supports a tank 86 which will contain the material to be sprayed from the nozzles 16 on the elongated spray boom 10. A flexible tubing 88 extends rearwardly from the tank 86 to the elongated spray boom 10 and is connected thereto by a suitable connection 90. The elongated spray boom 10 is tubular and has caps 92 provided on the ends thereof to prevent the spray from flowing out of the ends of the elongated boom. A pump 94 on the trailer 68 is adapted to pump the spray material from the tank 86 through the tubing 88 and into the elongated boom 10 where the spray material will be conveyed to the nozzles 16 and the spray will be allowed to diffuse from the nozzle 16 in a downward pattern 96.

The trailer 68 has a drawbar 98 thereon which has a yoke 100 at one end thereof for attaching a drafting plate 102 to the trailer 68. The drafting plate 102 has a series of holes 104 adacent to a periphery thereof which is approximately a quarter of a circle in configuration. Seven such apertures or holes 104 are shown in the drafting plate 102 in FIGURE 6. The cables 70 are threaded through the holes 104 in the drafting plate, against steel cable bearing elements 106 which are also threaded through the holes 104 in the drafting plate 102. The steel cable bearing elements 106 are designed to eliminate wear and tear on the cable 70 which would occur if the cables were allowed to bear directly against the edges of the holes 104. The cable 70 after being threaded through the holes 104 is folded back on itself as is shown at 108 in FIGURE 7 and the cable at 108 is rigidly affixed in place on the cable 70 by clamps 110 which are designed to oppose each other, and which are rigidly fastened down onto one another by nut and bolt means 112. The drafting plate 102 is connected to the yoke 100 of the drawbar 98 by a drafting bolt or pin 114 which extends through holes 116 in the yoke 100 and aperture or hole 118 in the drafting plate 102. A spring type cotter pin 120 extends through holes 122 in the head of the drafting pin, and 124 in the shank of the drafting pin.

The elongated spray boom 10 and supporting bracket runners 26 therefor may be pulled along the ground by pulling the trailer 68 in FIGURE 1 in the direction indicated by the arrow. The trailer 68 will pull the elongated spray boom 10 along the ground by the cables 70 which are connected to the elongated drafting bar 66 by the ring and eye joints 72 and are connected by the drafting plate 102 to the drawbar 98 of the trailer.

The elongated spraying boom 10 may be broken down into smaller sections by uncoupling the flexible hose with the female quick couplers 14 to eliminate sections thereof. The elongated drafting bar 66 may be broken down into smaller sections by uncoupling the hook screws 64 from the eye screw 62 illustrated in FIGURE 8. Therefore, it is seen that smaller spray boom arrangements may be readily obtained by uncoupling the proper flexible hose connections, and uncoupling the proper drawbar connections. Further, additional twenty-foot spray boom sections may be added to the elongated spray boom illustrated in FIGURE 1, by coupling an additional drafting bar to the arrangement illustrated together with two ten-foot boom sections. A 20-foot spray boom section may be broken down to a 10-foot spray boom section such as spray boom section 12 by uncoupling the flexible hose with female quick coupler 14 which connects two 10-foot spray boom sections 12 together, and disengaging the 20-foot drafting bar 48, which is adapted to draft these sections. A 10-foot section spray boom apparatus, having a 10-foot section spray boom 12 and two runner brackets 26 thereon may be drafted along the ground by connecting two cables 70 to the drafting plate 42 provided on the tips 40 of the runners or skiis 34 of the runner bracket.

It will be obvious to those skilled in the art after having read this disclosure, that a new and novel spray boom, and a new and novel supporting means for the spray boom have been disclosed. It will be readily apparent to those skilled in the art that spray boom sections as disclosed herein may readily be assembled or disassembled to construct an elongated spray boom of desired length for spraying crops. The spray boom is adjustable to various heights above the ground to provide a particular pattern control to the area to be sprayed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A boom type crop sprayer comprising a single elongated boom, a plurality of supports provided longitudinally along said boom, said supports each comprising an elongated runner having a leading end and a following end, said leading end comprising an upwardly turned forward tip, a single vertically extending arm rigidly engaged with and projecting upwardly from the following end, an inclined brace engaged between each runner and the corresponding arm, vertically adjustable means securing said boom to each vertically extending arm, an elongated drawbar paralleling said boom forward of said runners, means engaging the leading end of each runner with said drawbar, a plurality of discharge nozzles mounted on said boom and directed rearward of the runners, and means supplying fluid under pressure to said boom for discharge through said nozzles.

2. The sprayer of claim 1 wherein said vertically adjustable means securing said boom to each arm comprises at least one vertical row of holes defined on said arm and clamp means encircling said boom and having opposite ends thereof engaged within a selected pair of said holes above and below said boom.

3. The sprayer of claim 2 wherein said boom comprises a plurality of longitudinally aligned boom sections releasably interconnected by flexible hose couplings.

References Cited by the Examiner

UNITED STATES PATENTS

| | | | |
|---|---|---|---|
| 559,042 | 4/1896 | Potter | 239—175 X |
| 757,338 | 4/1904 | Nolting | 239—212 |
| 1,526,642 | 2/1925 | Nissley | 239—164 |
| 1,727,294 | 9/1929 | Lennon | 239—175 X |
| 1,862,232 | 6/1932 | McLeod | 239—286 X |
| 2,501,555 | 3/1950 | White | 239—175 |
| 2,575,521 | 11/1951 | Ireland | 239—169 X |
| 2,607,336 | 8/1952 | Everts. | |
| 2,735,251 | 2/1956 | Dlugosch | 280—411 |
| 3,092,328 | 6/1963 | Patterson et al. | 239—172 X |

FOREIGN PATENTS

| | | |
|---|---|---|
| 489,066 | 4/1918 | France. |
| 371,312 | 3/1923 | Germany. |
| 641,779 | 2/1937 | Germany. |

M. HENSON WOOD, Jr., *Primary Examiner.*

V. C. WILKS, *Assistant Examiner.*